(12) United States Patent
Minakuchi

(10) Patent No.: US 7,551,195 B2
(45) Date of Patent: Jun. 23, 2009

(54) LIGHT SCANNING DEVICE

(75) Inventor: Tadashi Minakuchi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 490 days.

(21) Appl. No.: 11/224,027

(22) Filed: Sep. 13, 2005

(65) Prior Publication Data

US 2006/0055765 A1 Mar. 16, 2006

(30) Foreign Application Priority Data

Sep. 15, 2004 (JP) ............................ 2004-267750

(51) Int. Cl.
*G02B 26/10* (2006.01)
*B41J 2/47* (2006.01)

(52) U.S. Cl. ...................................... 347/250
(58) Field of Classification Search ................ 347/235, 347/250

See application file for complete search history.

(56) References Cited

U.S. PATENT DOCUMENTS 6,259,466 B1 * 7/2001 Oomura et al. ............. 347/237
6,844,892 B2   1/2005 Lima et al.
6,937,376 B2   8/2005 Takakubo

FOREIGN PATENT DOCUMENTS

JP        11-160636        6/1999

OTHER PUBLICATIONS

English Language Abstract of JP 11-160636.
U.S. Appl. No. 11/217,481 to Kasai, filed Sep. 2, 2005.
U.S. Appl. No. 11/211,639 to Kasai, filed Aug. 26, 2005.

* cited by examiner

*Primary Examiner*—Huan H Tran
(74) *Attorney, Agent, or Firm*—Greenblum & Bernstein, P.L.C.

(57) ABSTRACT

A light scanning device capable of scanning a light beam on a photosensitive surface includes a light receiving system configured to receive the light beam and output a light receiving signal and a synchronizing signal generating system configured to generate a synchronizing signal with which light scanning is synchronized. The synchronizing signal generating system includes a first bias superimposing system configured to superimpose a first bias signal onto the light receiving signals to generate a first light receiving signal, a second bias superimposing system configured to superimpose a second bias signal with a different level from that of the first bias signal onto the light receiving signals to generate a second light receiving signal, a waveform shaping system configured to shape the waveform of the second light receiving signal, and a comparing system configured to compare the first light receiving signal with the second light receiving signal to output the synchronizing signal.

11 Claims, 11 Drawing Sheets

NORMAL OPERATION $\Delta Vbe$

SOS SIGNAL

LIGHT RECEIVING
CURRENT FLUCTUATION $\Delta Vbe$ $\Delta Lp2$ $\Delta Lp1$

SOS SIGNAL

NORMAL OPERATION

SOS SIGNAL

DC LEVEL SHIFT

SOS SIGNAL

LIGHT SCANNING DEVICE

BACKGROUND OF THE INVENTION

The present invention relates to a light scanning device used for a laser beam printer, etc. More particularly, the present invention relates to a laser scanning device, and especially to a circuit configured to detect an SOS (start-of-scan) signal used as a synchronizing signal for determining laser scanning timing.

So as to obtain an SOS signal used as a timing signal while scanning a laser beam on a image plane, a laser scanning device is configured to generate the SOS signal based on a light receiving signal outputted from a photo diode (hereinafter, referred to as a PD) that receives the scanned laser beam. For instance, in a laser scanning device as indicated in FIG. 1, a laser beam LB emitted from a laser diode (hereinafter, referred to as an LD) 1 is deflected and scanned by a rapidly rotating polygon mirror 2 within a predetermined angle range, and main scanning of the LB directed to a photoconductive drum 4 through an fθ lens 3 is performed on a photosensitive surface of the axially-rotating photoconductive drum 4. Further, there is provided a PD 5 on a scanning optical path of the LB. The PD 5 receives the scanned LB and outputs the photoelectrically-converted light receiving signal. The SOS signal is obtained by processing the light receiving signal with an SOS signal generating circuit 6. On the basis of the SOS signal, a controlling circuit 7 controls an LD driving circuit 8, a polygon mirror driving circuit 9, and a photoconductive drum driving circuit 10 to make the laser scanning device start drawing with the laser beam a fixed time after receiving the SOS signal. This operation allows drawing on a specific area 4a of the photoconductive drum 4 with synchronized scanning timing.

As such an SOS signal generating circuit, conventionally, a technology has been proposed to compare the light receiving signal outputted from the PD receiving the LB with a reference potential. For example, an SOS signal generating circuit shown in FIG. 9 is configured to convert a light receiving current Io, which is outputted from a PD 5 when the PD 5 receives a laser beam to be scanned, to a light receiving voltage Vo by means of an I-V converting circuit 11 provided with an operational amplifier OP and a resistor R, and to output the SOS signal in accordance with comparison by a comparator 12 between the converted light receiving voltage Vo and a reference voltage Vref. In other words, the SOS signal generating circuit is configured to output the SOS signal from the comparator 12 when the light receiving voltage Vo is lower than the reference voltage Vref.

In such a technology, there is a problem that when fluctuations occur in the level of the light receiving current Io outputted from the PD 5 and/or the DC level (dark current, offset current) of the I-V converting circuit 11 that converts the light receiving current to the light receiving voltage Vo, the waveform of the SOS signal is deformed to cause timing deviation (phase shift in time domain) of the SOS signal. For instance, as shown in FIG. 10B, when the level of the light receiving current Io (that is, the negative level of the light receiving current Io with respect to the DC level thereof) outputted from the PD 5 decreases due to degradation of the LD 1 and/or the light receiving surface of the PD 5, the pulse width of the SOS signal is narrower than usual operation. Since the synchronous timing of the laser scanning device is defined by the rising and falling edges of the SOS signal, such fluctuation of the pulse width of the SOS signal directly leads to the deviation of the synchronous timing. In addition, as shown in FIG. 10C, when the DC level of the output from the I-V converting circuit 11 shifts in negative direction, the absolute value of the light receiving current Io (light receiving voltage Vo) is larger during the SOS signal, and thereby the pulse width of the SOS signal is larger. Similarly in this case, the fluctuation of the pulse width of the SOS signal results in the deviation of the synchronous timing.

As an example to solve one of the above deviations of the synchronous timing, which is especially caused by the fluctuation of the PD output, Japanese Patent Provisional Publication No. HEI11-160636 discloses a technique to adjust the reference voltage of the comparator by a CPU which controls the LD to change the image deepness. The reference voltage of the comparator is adjusted by the CPU in order to compensate the deviation of the synchronous timing that is caused by the deformation of the SOS signal waveform according to the level fluctuation of the light receiving signal outputted from a synchronizing sensor, i.e., the PD when the image deepness is changed. Thereby, the reference voltage is shifted according to the fluctuation of the PD output to compensate the deviation of the synchronous timing due to the deformation of the SOS signal waveform.

Since the above technique is adapted to shift the reference voltage of the comparator according to the fluctuation of the light receiving signal outputted from the PD when the image deepness is changed, it can compensate the deviation of the synchronous timing in the case where the rising or falling of the level of the light receiving signal from the PD is previously known. However, it cannot support the deviation of the synchronous timing that is caused by uncertain factors such as the level fluctuation of the PD output depending on temperature and/or time and the DC level shift of the I-V converting circuit.

SUMMARY OF THE INVENTION

The present invention is advantageous in that an improved light scanning device includes a synchronizing signal generating circuit. The synchronizing signal generating circuit is configured to reduce or eliminate the deviation of synchronous timing in spite of the DC level shift, which depends on a power supply voltage and/or temperature. The synchronizing signal generating circuit is also configured to reduce or eliminate the deviation of synchronous timing in spite of the level fluctuation of a light receiving signal outputted from a PD.

According to an aspect of the invention, there is provided a light scanning device including a light emitting system configured to emit a light beam to be scanned, a light scanning system configured to deflect the light beam emitted from the light emitting system to scan the light beam on a photosensitive surface, a light receiving system configured to receive the light beam and output a light receiving signal, and a synchronizing signal generating system configured to generate a synchronizing signal with which light scanning performed by the light scanning system is synchronized. The synchronizing signal generating system divides the light receiving signal into two light receiving signals and includes a first bias superimposing system configured to superimpose a first bias signal onto one of the two light receiving signals to generate a first light receiving signal, a second bias superimposing system configured to superimpose a second bias signal with a different level from the level of the first bias signal onto the other of the two light receiving signals to generate a second light receiving signal, a waveform shaping system configured to shape the waveform of the second light receiving signal, and a comparing system configured to compare the first light receiving signal with the second light receiving signal to output the synchronizing signal.

Optionally, the waveform shaping system may reduce a signal peak which arises while the light receiving system is receiving the light beam.

Further optionally, the waveform shaping system may be a low-pass filter.

Yet optionally, the first and second bias superimposing systems may be configured to generate the first and second bias signals with different levels by making bias currents to be carried through the first and second bias superimposing systems different from one another and superimpose the first and second bias signals onto respective ones of the two light receiving signals to generate the first and second light receiving signals, respectively.

Optionally, each of the first and second bias superimposing systems may be configured as a series circuit of the same kind of element and a resistor. Further, the first and second bias signals may be generated by applying the respective resistors with different resistances from one another to the first and second bias superimposing systems, respectively.

Furthermore, each of the first and second bias superimposing systems may be configured as a series circuit of the same kind of element and a constant current source. Optionally, each of the first and second bias signals may be generated by independently controlling the current value of the constant current source.

Still optionally, the element, in each of the first and second bias superimposing systems, may be configured with one of a diode and a transistor, and may be mounted close to the other element on the same circuit board, or may be incorporated together with the other element in the same package.

According to another aspect of the invention, there is provided a light scanning device including a light emitting system configured to emit a light beam to be scanned, a light scanning system configured to deflect the light beam emitted from the light emitting system to scan the light beam on a photosensitive surface, a light receiving system configured to receive the light beam and output a light receiving signal, and a synchronizing signal generating system configured to generate a synchronizing signal with which light scanning performed by the light scanning system is synchronized. In this case, the synchronizing signal generating system divides the light receiving signal into two light receiving signals and includes a waveform shaping system configured to shape the waveform of one of the two light receiving signals, a first bias superimposing system configured to superimpose a first bias signal onto the other of the two light receiving signals to generate a first light receiving signal, a second bias superimposing system configured to superimpose a second bias signal with a different level from the level of the first bias signal onto the waveform-shaped one of the two light receiving signals to generate a second light receiving signal, and a comparing system configured to compare the first light receiving signal with the second light receiving signal to output the synchronizing signal.

BRIEF DESCRIPTION OF THE ACCOMPANYING DRAWINGS

Figure 3A:
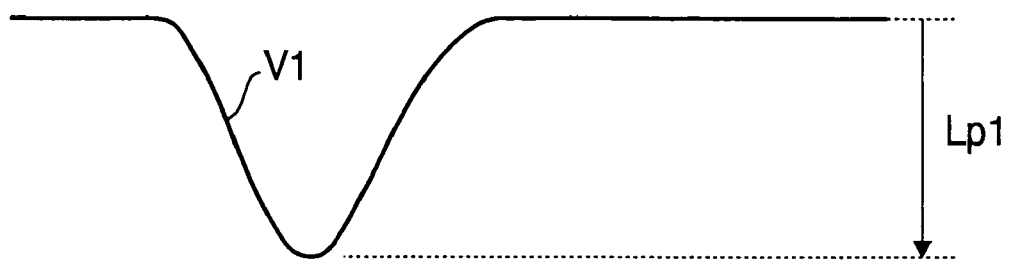
Figure 3B:
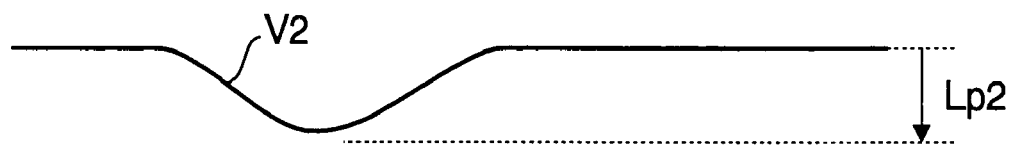
Figure 3C:
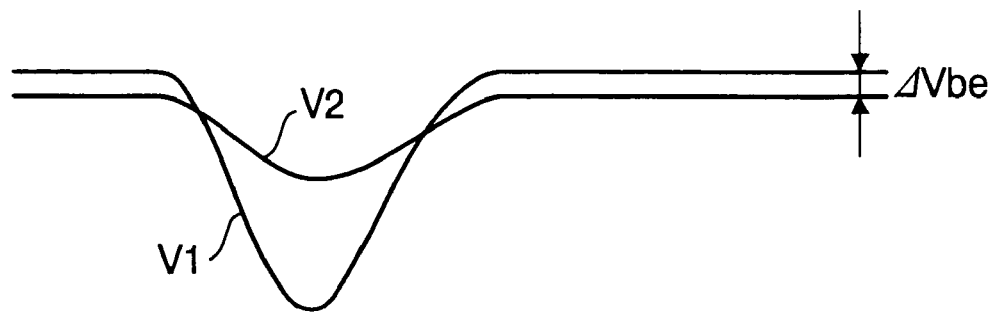
Figure 4A:
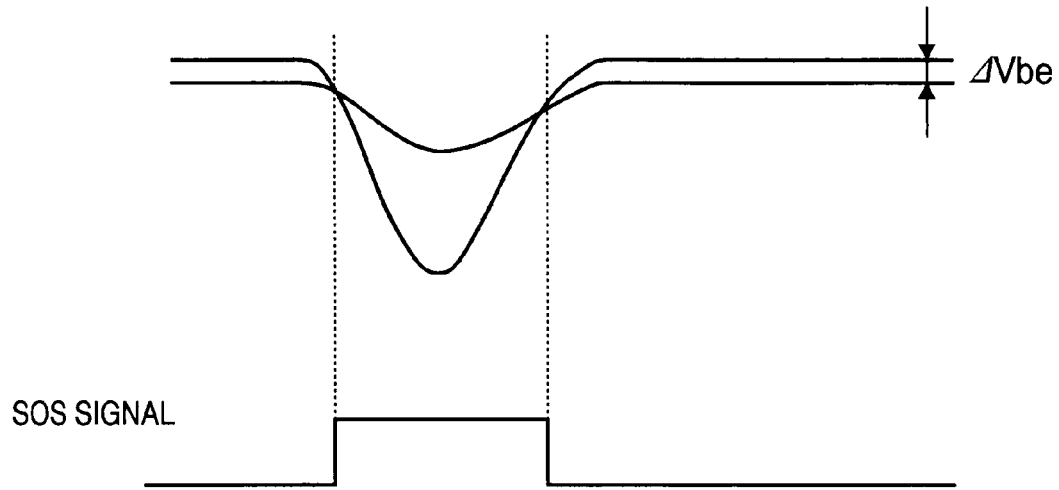
Figure 4B:
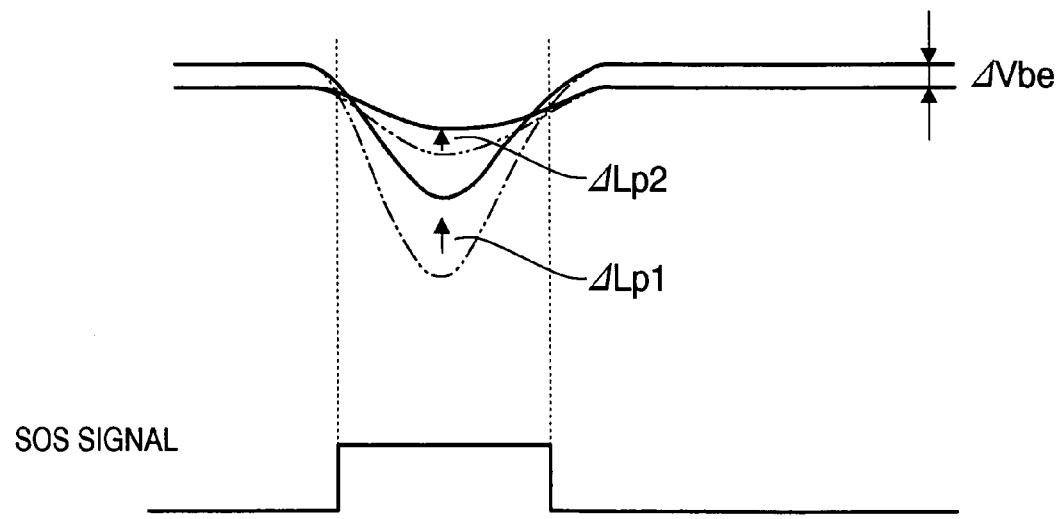
Figure 5A:
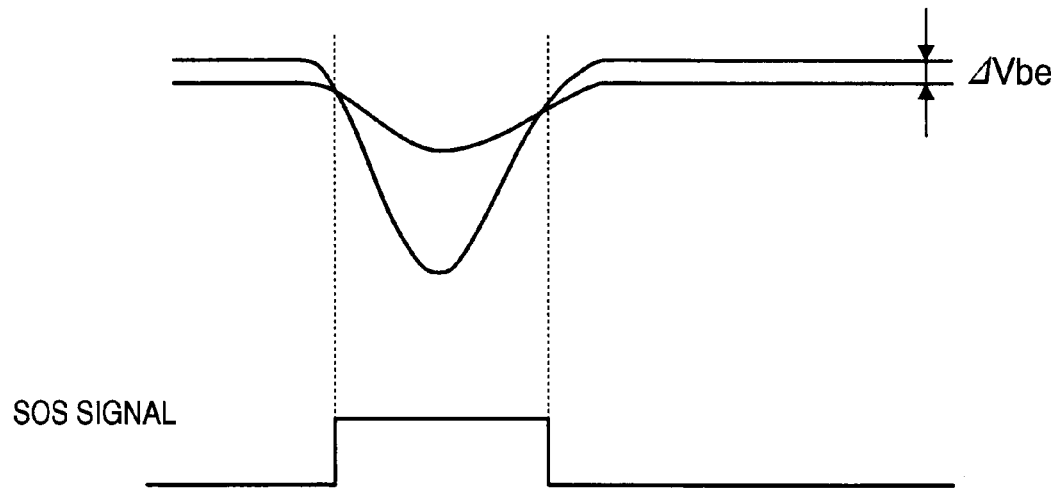
Figure 5B:
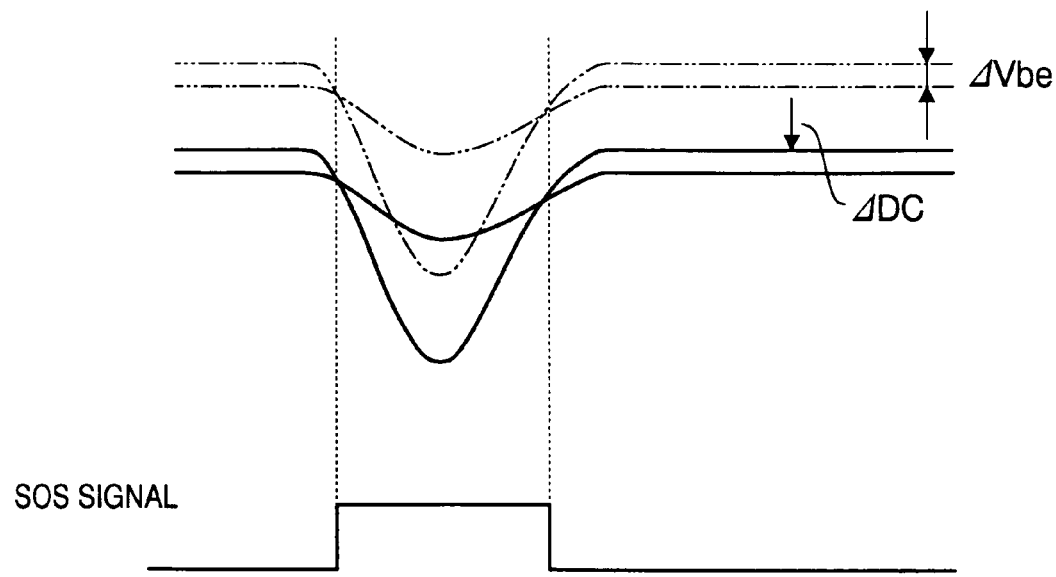
Figure 6:
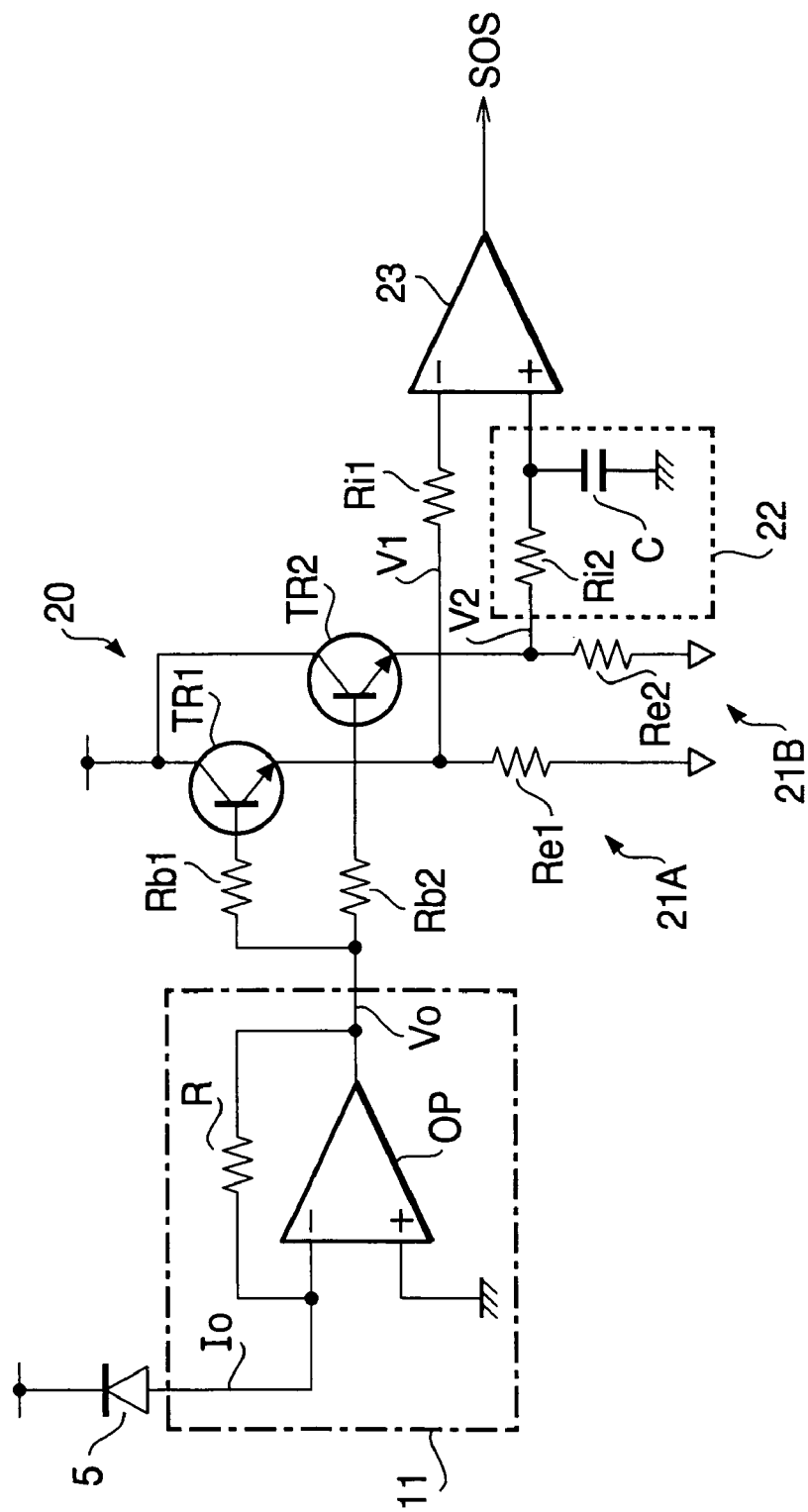
Figure 7:
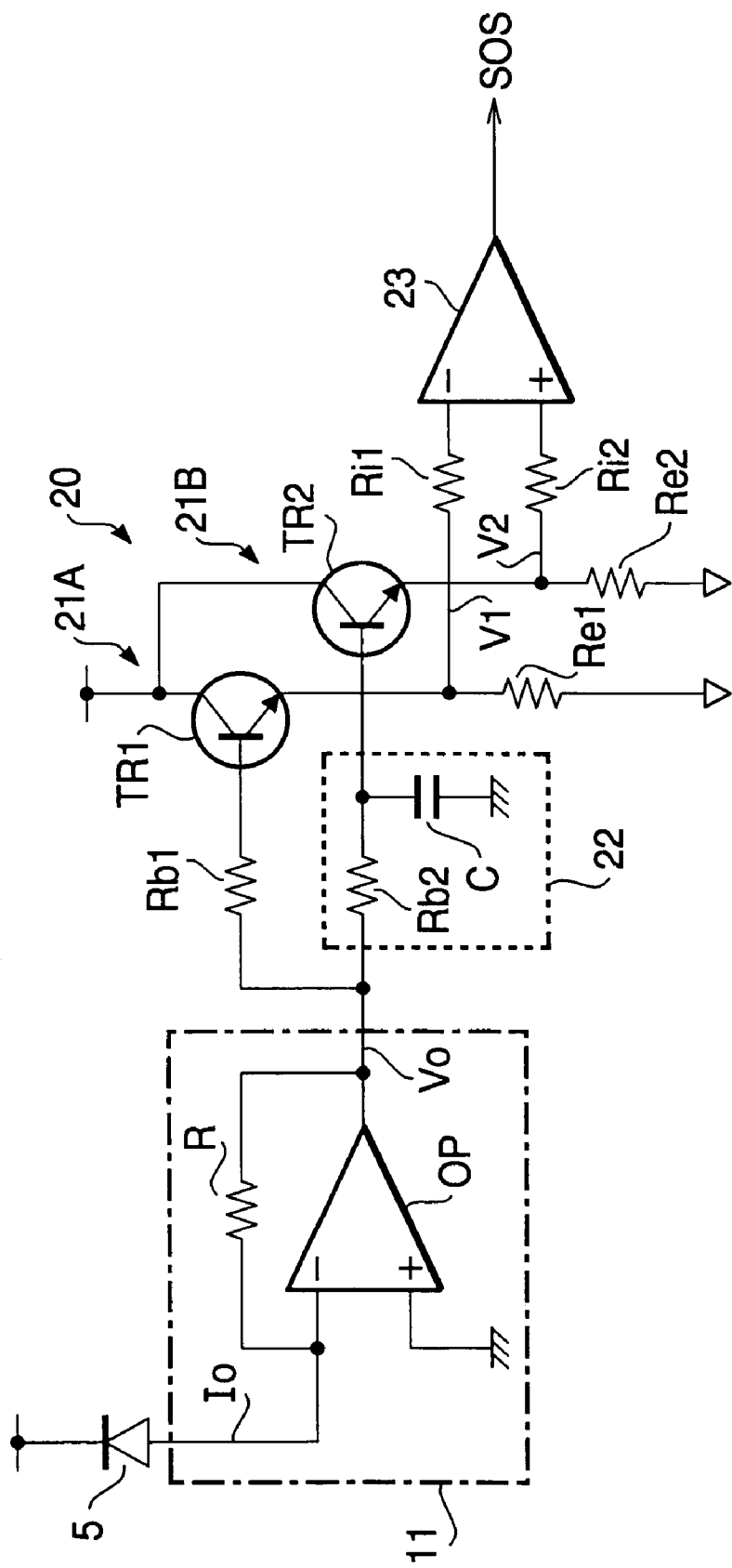
Figure 8:
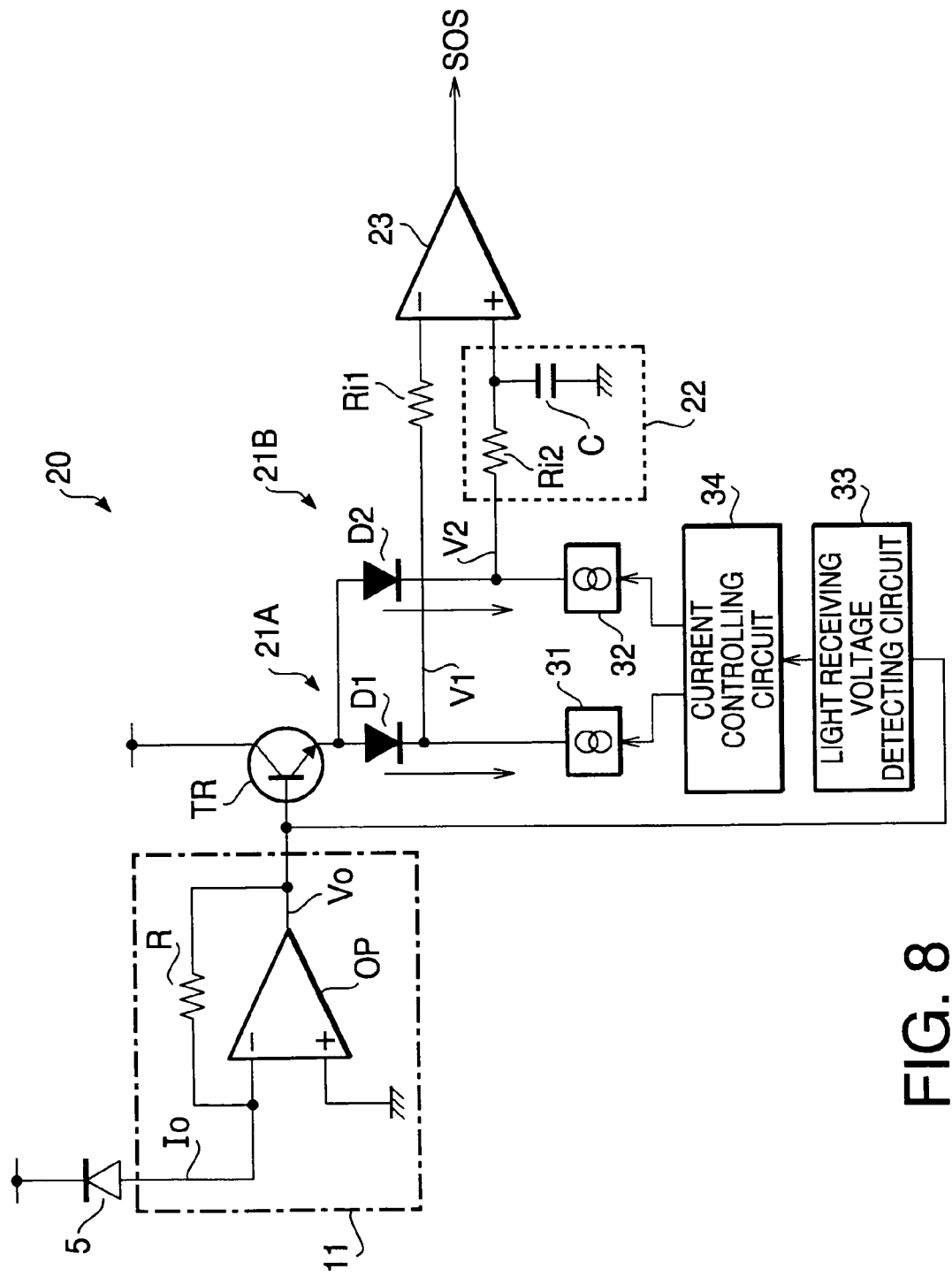
Figure 9:
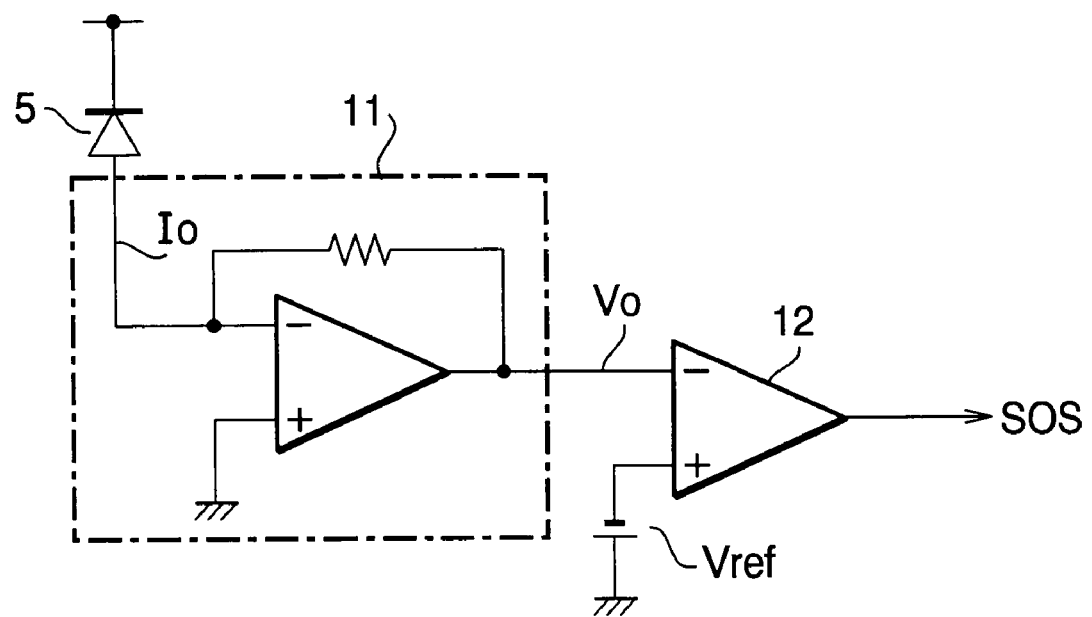
Figure 10A:
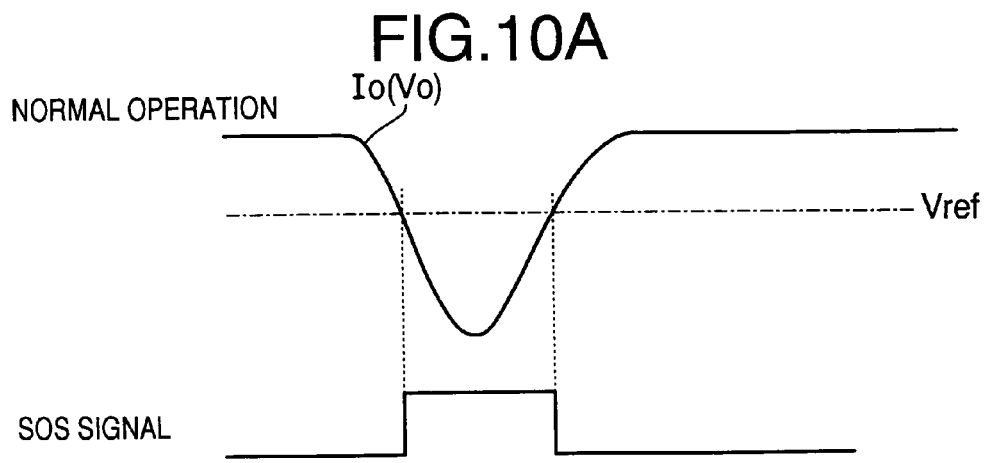
Figure 10B:
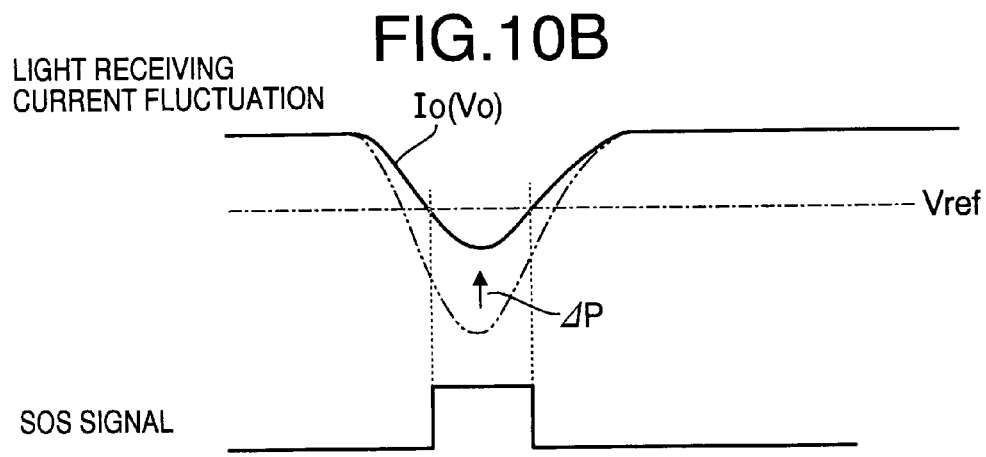
Figure 10C:
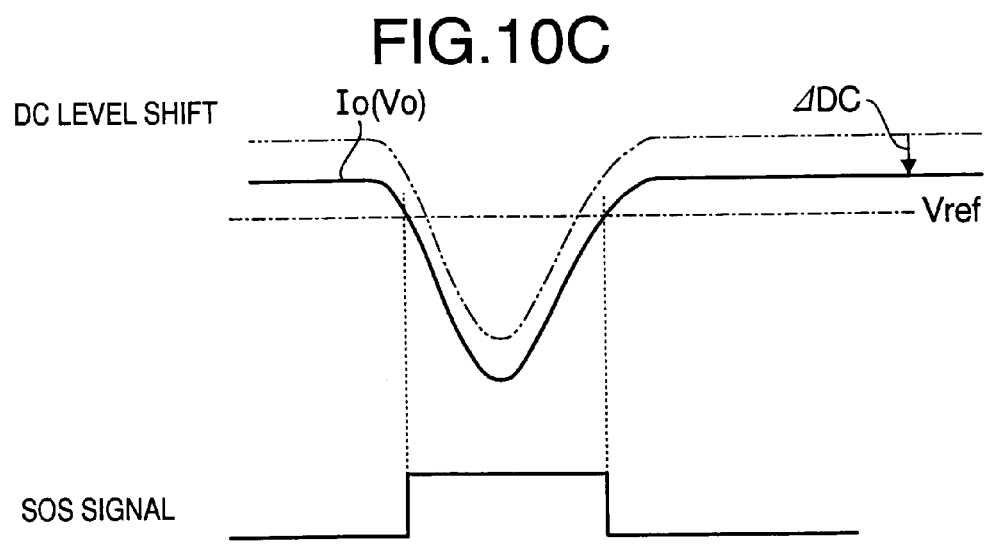
Figure 11A:
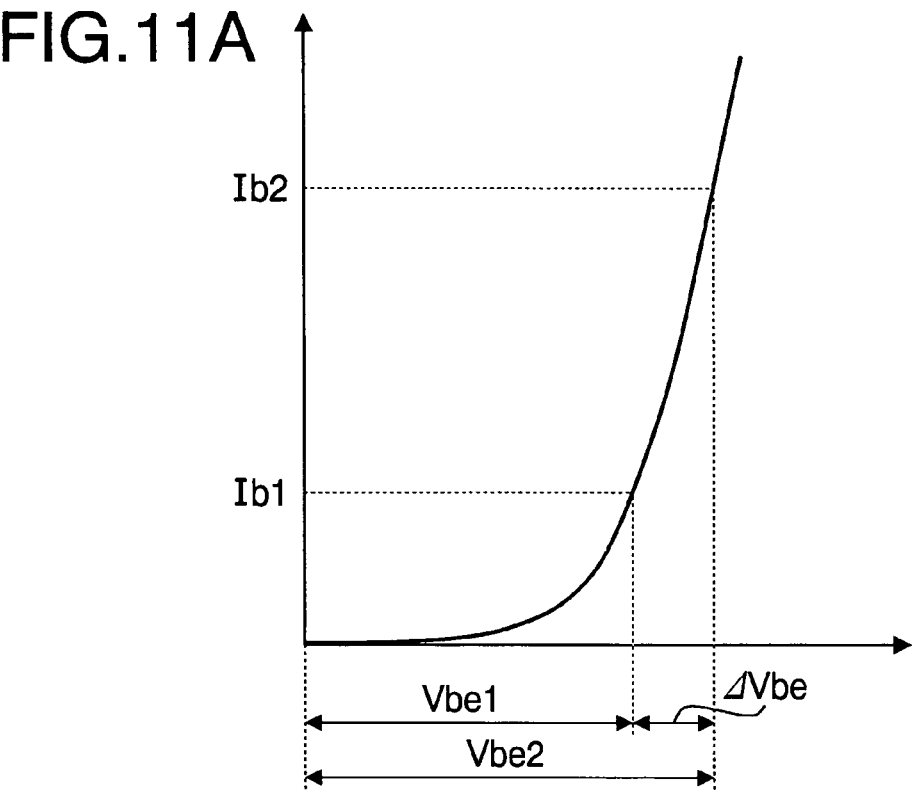
Figure 11B:
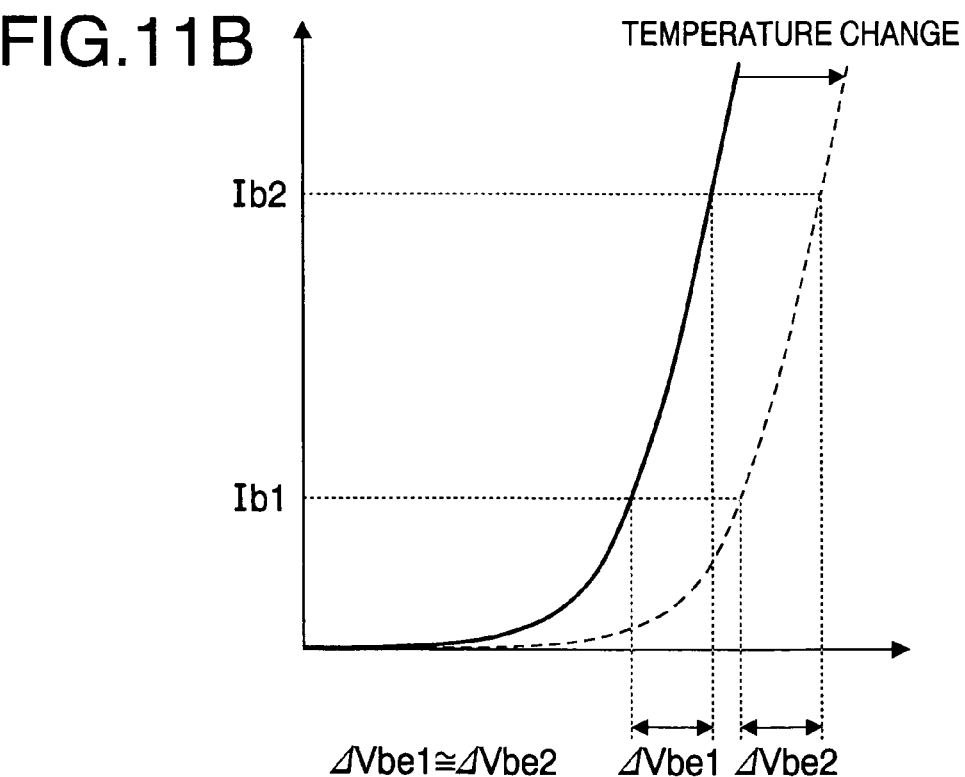

FIG. 3A schematically shows a waveform of a first voltage signal;

FIG. 3B schematically shows a waveform of a second voltage signal;

FIG. 3C schematically shows the waveforms of the first and second voltage signals together;

FIGS. 4A and 4B are waveform charts illustrating relationships among an SOS signal and the first and second voltage signals, in a normal operation and when the level of a light receiving signal from the PD decreases, respectively;

FIGS. 5A and 5B are waveform charts illustrating relationships among the SOS signal and the first and second voltage signals, in the normal operation and when a DC level of an I-V converting circuit increases in the negative direction, respectively;

FIG. 6 is a circuit diagram of an SOS signal generating circuit according to a second embodiment;

FIG. 7 is a circuit diagram of an SOS signal generating circuit according to a third embodiment;

FIG. 8 is a circuit diagram of an SOS signal generating circuit according to a fourth embodiment;

FIG. 9 is a circuit diagram of a conventional SOS signal generating circuit;

FIGS. 10A, 10B, and 10C are waveform charts illustrating relationships among an SOS signal, a light receiving signal, and a reference voltage in the conventional SOS signal generating circuit, in a normal operation, when the level of a light receiving signal from the PD decreases, and when a DC level of an I-V converting circuit increases in the negative direction, respectively; and FIGS. 11A and 11B schematically show forward voltage characteristics of an element such as a diode and a transistor employed in the SOS signal generating circuit, in a normal operation and when environmental temperature around the element changes, respectively.

DETAILED DESCRIPTION OF THE EMBODIMENTS

In each embodiment described below, a waveform shaping circuit is configured with a low-pass filter or with a circuit for reducing a signal peak which arises while receiving a laser beam. The above circuit for reducing a signal peak, which can reduce a signal peak limitlessly close to zero, may involve a circuit that can make the signal peak zero (i.e., that can absolutely remove the signal peak).

In addition, in order to superimpose corresponding one of first and second bias signals, each of a first and second bias superimposing circuit is configured as a series circuit of an element carrying a bias current and a resistor, which is different in resistance from that of the other to carry a different bias current. Thereby, each bias superimposing circuit can generate an output bias voltage different from that of the other by a minute constant voltage. Each of the first and second bias superimposing circuits may be configured as a series circuit of an element and a constant bias current source, which can separately control a value of a current to be carried to adjust an output bias voltage of the bias superimposing circuit. Each element is a diode or a transistor, which are mounted close to one another on the same circuit board, or are formed in the same package.

First Embodiment

Figure 1:
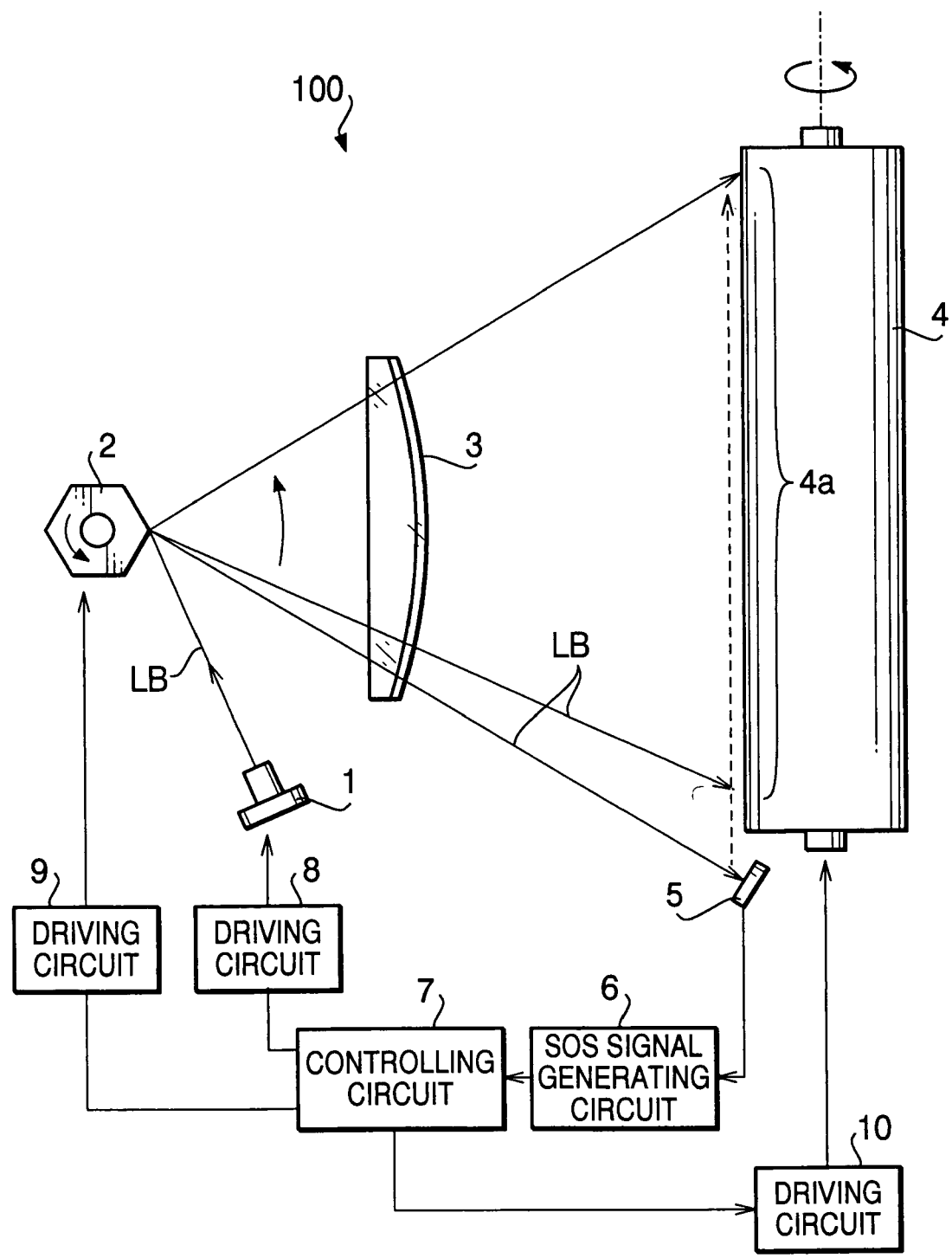
FIG. 1 is a schematic perspective view of a laser scanning device according to the present invention.

Next, a first embodiment of the present invention will be described with reference to the accompanying drawings. In a laser scanning device 100 shown in FIG. 1, to which the first embodiment is applied, an SOS signal is generated by an SOS signal generating circuit 6 on the basis of a light receiving signal outputted from a PD 5 while receiving a laser beam, and is inputted to a controlling circuit 7. The controlling circuit 7, based on the inputted SOS signal, controls an LD driving circuit 8 to control emission from an LD 1, and controls a polygon mirror driving circuit 9 and a photoconductive drum driving circuit 10. Thereby, the laser beam is scanned on a predetermined area 4a of the photoconductive drum 4 in synchronization with the SOS signal to draw a required pattern.

Figure 2:
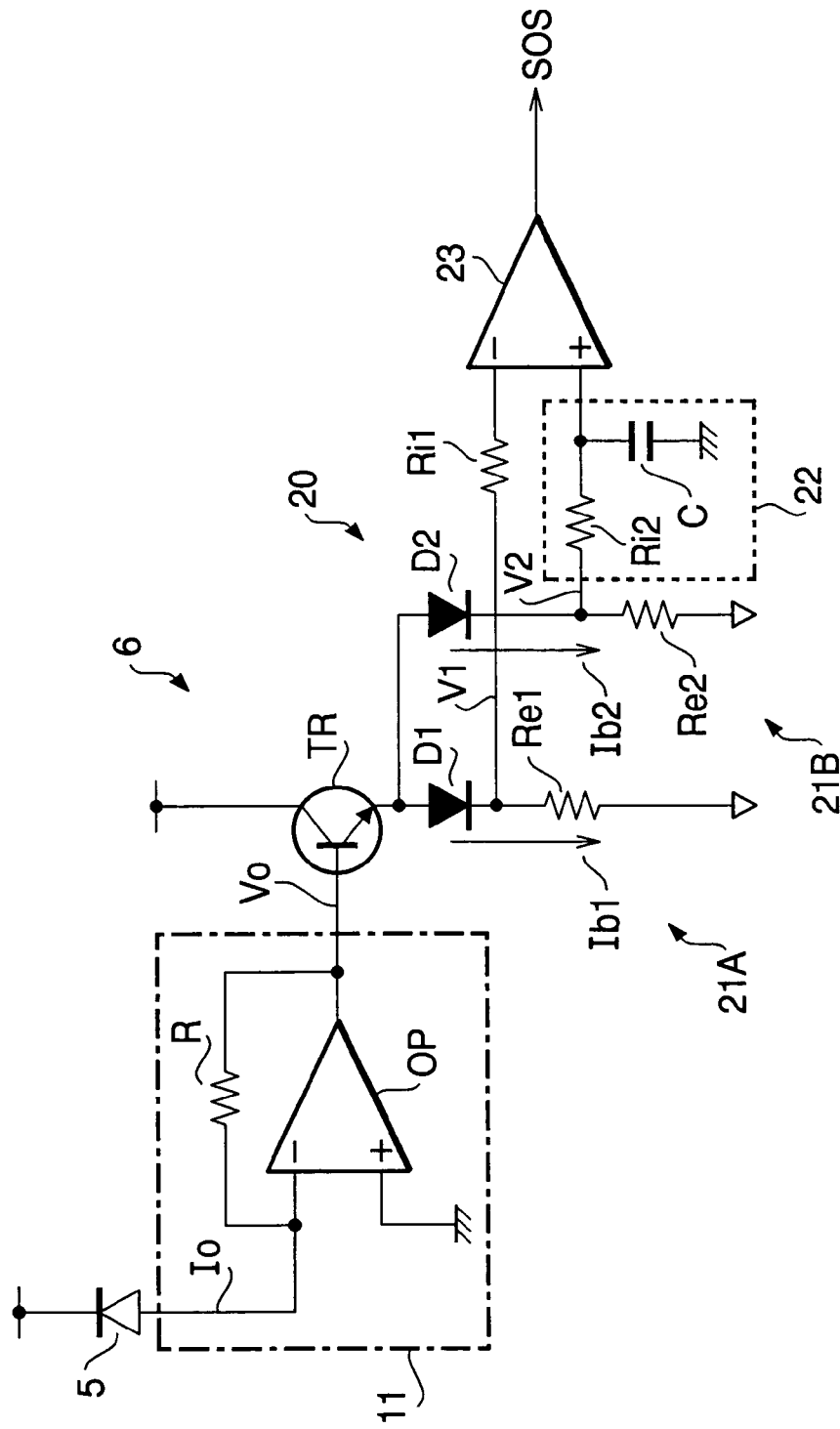
FIG. 2 is a circuit diagram of an SOS signal generating circuit according to a first embodiment of the present invention.

FIG. 2 is a circuit diagram of the SOS signal generating circuit 6. The SOS signal generating circuit 6 is configured with an SOS signal detecting circuit 20 and with an I-V converting circuit 11 that converts a light receiving current Io outputted from the PD 5 into a light receiving voltage Vo.

The I-V converting circuit 11 is configured with an operational amplifier OP and a resistor R such that the light receiving current Io inputted to an inverting input terminal of the operational amplifier OP is converted into a voltage generated between both terminals of the resistor R. The voltage is outputted as the light receiving voltage Vo. Since this kind of I-V converting circuit has been already widely known, a detailed explanation of a current-voltage converting operation will be omitted.

The SOS signal detecting circuit 20 is configured with a first bias superimposing circuit 21A and a second bias superimposing circuit 21B that superimpose respective different levels of bias signals onto the light receiving voltage Vo outputted from the I-V converting circuit 11. The SOS signal detecting circuit 20 is also configured with a waveform shaping circuit 22 that shapes the signal waveform of the light receiving voltage Vo onto which the bias signal is superimposed by the second bias superimposing circuit 21B, and a comparator 23 that compares a signal which is made pass through the waveform shaping circuit 22 with a signal which is not made to pass therethrough, to output the SOS signal from the comparator 23. The first and second bias superimposing circuits 21A and 21B are provided with an NPN transistor TR as a common circuit, to the base of which the light receiving voltage Vo is inputted. The first bias superimposing circuit 21A is configured with a first diode D1 that is connected with the emitter of the NPN transistor TR and a first emitter resistor Re1 that is connected in series with the first diode D1. The second bias superimposing circuit 21B is configured with a second diode D2 that is connected with the emitter of the NPN transistor TR and a second emitter resistor Re2 that is connected in series with the second diode D2. The collector of the NPN transistor TR is connected to a first required voltage source, and the other terminals of the first and second emitter resistors Re1 and Re2 are connected to a second required voltage source. In addition, the first and second diodes D1 and D2 are configured to have the same specifications, and the first and second emitter resistors Re1 and Re2 are configured to have different resistance. In this embodiment, the resistance of the second emitter resistor Re2 is smaller than that of the first emitter resistor Re1.

The second diode D2 constitutes the second bias superimposing circuit 21B. The waveform shaping circuit 22 is configured as a low-pass filter LPF circuit that removes high frequency components from a second voltage signal V2 which is outputted to a connection point between the second diode D2 and the second emitter resistor Re2. The low-pass filter LPF is provided with a second input resistor Ri2 and a condenser C. A first voltage signal V1 is outputted to a connection point between the first diode D1 and the first emitter resistor Re1. The comparator 23 is configured such that a first voltage signal V1 is inputted to a negative input terminal thereof through a first input resistor Ri1. A signal passing through the waveform shaping circuit 22 is inputted to a positive input terminal of the comparator 23, and the SOS signal is outputted based on a result of comparison between the first and second voltage signals V1 and V2. In this case, the first and second input resistors Ri1 and Ri2 have the same resistance.

In the SOS signal generating circuit 6 of this embodiment, if a dark current of the PD 5 is assumed very small when the PD 5 does not receive the laser beam, a base bias voltage applied to the base of the NPN transistor TR will be substantially GND level. The NPN transistor TR functions as an emitter follower that uses the first diode D1 and the first emitter resistor Re1, and the second diode D2 and the second emitter resistor Re2 as emitter loads, and bias currents Ib1 and Ib2 according to bias conditions are carried to the line of the first diode D1 and the first emitter resistor Re1 and the line of the second diode D2 and the second emitter resistor Re2, respectively. At this time, since the first and second diodes D1 and D2 have the same characteristics whereas the first and second emitter resistors Re1 and Re2 are different in resistance from one another, the respective bias currents Ib1 and Ib2 are different from one another, and thereby a forward voltage Vbe1 generated in the first diode D1, as shown in FIG. 11A, is different from a forward voltage Vbe2 generated in the second diode D2. Therefore, the output voltage of the first bias superimposing circuit 21A and the output voltage of the second bias superimposing circuit 21B, i.e., the first voltage signal V1 at the connection point between the first diode D1 and the first emitter resistor Re1 and the second voltage signal V2 at the connection point between the second diode D2 and the second emitter resistor Re2 are different by $\Delta$Vbe from one another. In this case, the second voltage signal V2 is set higher in the negative direction than the first voltage signal In this initial condition, if the PD 5 receives the laser beam, the PD 5 will output the pulse light receiving current Io, which is inputted to the base of the NPN transistor TR after being converted into the light receiving voltage Vo by the I-V converting circuit 11. Thereby, a collector-emitter current of the NPN transistor TR is increased, and the first voltage signal V1, as shown in FIG. 3A, shows a single pulse waveform with a predetermined peak value Lp1. On the contrary, although the second voltage signal V2 shows a similar pulse waveform, since the LPF circuit 22 is connected in the route of the second voltage signal V2, high frequency components of the second voltage signal V2 are reduced such that the second voltage signal V2 is shaped to a waveform with a lower peak value Lp2 as shown in FIG. 3B. Then, since a voltage corresponding to the bias current Ib1 is superimposed onto the first voltage signal V1 with the higher peak value, and a voltage corresponding to the bias current Ib2 is superimposed onto the second voltage signal V2 with the lower peak value, a voltage superimposed onto the second voltage signal V2, as a result, is $\Delta$Vbe higher in the negative direction than that superimposed onto the first voltage signal V1, as shown in FIG. 3C. Thereby, when the PD 5 receives the laser beam, the waveform of the first voltage signal V1 intersects with that of the second voltage signal V2, as shown in FIG. 3C.

Therefore, when the above first and second voltage signals V1 and V2 are inputted to the comparator 23 on the basis of the light receiving signal generated by the PD 5 while receiving the laser beam LB in a normal operation of the PD 5, the comparator 23, as shown in FIG. 4A, outputs the SOS signal while the absolute voltage of the first voltage signal V1 is lower than that of the second voltage signal V2. In other words, the time width of the SOS signal is defined by the time period when the first and second voltage signals V1 and V2 are inverted with respect to their levels.

For instance, when the level of the light receiving signal from the PD 5 decreases from the level in the normal operation in which the SOS signal can be adequately obtained, as shown in FIG. 4B, due to deterioration of the LD 1, the peak values of the first and second voltage signals V1 and V2 are reduced by ΔLp1 and ΔLp2, respectively. However, the bias difference ΔVbe between the first and second voltage signals V1 and V2 is set very small and constant. In addition, the first and second voltage signals V1 and V2 are reduced at the same rate. Accordingly, the intersections of both waveforms of the first and second voltage signals V1 and V2 are hardly shifted in time domain. As a result, the SOS signal outputted from the comparator 23 can be detected at substantially the same timing as before the level of the light receiving signal decreases, and thereby there is substantially no time lag in the synchronizing timing obtained from the SOS signal.

On the other hand, for example, when the output DC level of the I-V converting circuit 11 increases in the negative direction from the level in the normal operation, due to a change in the dark current of the PD 5, the levels of the first and second voltage signals V1 and V2 increase by ΔDC in the negative direction as shown in FIG. 5B from the levels in the normal operation shown in FIG. 5A. However, in this case, unless the above change is so dramatic that the bias currents Ib1 and Ib2 are hardly carried through the first and second diodes D1 and D2, the bias difference ΔVbe between both of the first and second voltage signals V1 and V2 will be substantially constant without any changes therein. Accordingly, the intersections of both waveformes of the first and second voltage signals V1 and V2 are hardly shifted in time domain, and thereby the SOS signal detecting timing outputted from the comparator 23 is the same as before the DC level increases, and there is substantially no time lag in the synchronizing timing obtained from the SOS signal. In addition, since the first and second diodes D1 and D2 have the same characteristics such that the bias difference ΔVbe can be substantially constant, as shown in FIG. 11B, even though environmental temperature around the diodes changes, the intersections of both waveforms of the first and second voltage signals V1 and V2 are scarcely shifted in time domain. Therefore, in this case, there is substantially no time lag in the SOS signal detecting timing outputted from the comparator 23.

As mentioned above, the SOS signal generating circuit 6 superimposes the bias voltages with the very small and constant bias difference ΔVbe therebetween onto the light receiving voltage Vo by means of the first and second bias superimposing circuits 21A and 21B, respectively, to obtain the first voltage signal V1 and the waveform-shaped second voltage signal V2, and additionally obtains the SOS signal by comparing the first and second voltage signals V1 and V2 with one another. Therefore, even though the output of the LD 1 fluctuates, and/or the output level of the PD 5 fluctuates, and/or the DC level of the output of the I-V converting circuit 11 shifts, and/or the environmental temperature around the diodes that generate the bias voltage difference ΔVbe changes, the SOS signal can be obtained as a definite timing signal such that the synchronizing signal is generated with substantially no time lag.

Second Embodiment

FIG. 6 is a circuit diagram of an SOS signal generating circuit of a second embodiment according to the present invention, in which the same reference numbers are assigned to parts equivalent to the first embodiment. The second embodiment is different from the first embodiment in configurations of first and second bias superimposing circuits 21A and 21B of an SOS signal detecting circuit 20. The first and second bias superimposing circuits 21A and 21B are configured with first and second NPN transistors TR1 and TR2 with the same specifications, respectively. In the first bias superimposing circuit 21A, a light receiving voltage outputted from an I-V converting circuit 11 is applied to the base of the first NPN transistor TR1 via a first base resistor Rb1, while the light receiving voltage, in the second bias superimposing circuit 21B, is applied to the base of the second NPN transistor TR2 via a second base resistor Rb2 with the same resistance as the first base resistor Rb1. Basically, this embodiment intends to carry out the operation that is performed by the diodes D1 and D2 in the first embodiment between the bases and emitters of the first and second transistors TR1 and TR2. In other words, the emitters of the first and second NPN transistors TR1 and TR2 are connected with the first and second emitter resistors Re1 and Re2, respectively, and the transistors TR1 and TR2 output respective emitter voltages, i.e., first and second voltage signals V1 and V2 at connection points between the transistors and the resistors, respectively, the voltage signals being inputted to a comparator 23. In this case, the resistance of the second emitter resistor Re2 is smaller than that of the first emitter resistor Re1. The configuration of an LPF circuit as a waveform shaping circuit and the comparator are the same as those of the first embodiment.

In a similar fashion to the first embodiment, an SOS signal, in the second embodiment, can be obtained such that there is substantially no time lag in the synchronizing timing, as shown in FIG. 4 when the level of a light receiving signal generated by a PD 5 decreases, as shown in FIG. 5 when the DC level of the I-V converting circuit 11 etc. increases, and based on a similar mechanism to that shown in FIG. 11B, consequently as shown in FIG. 5 when the environmental temperature around the transistors TR1 and TR2 that generate a bias voltage difference ΔVbe. Moreover, in the second embodiment, the first and second bias superimposing circuits 21A and 21B are configured with two transistors instead of one transistor and two diodes in the first embodiment, and thereby the configuration of the circuit, which has less elements than that of the first embodiment, can be simplified.

Third Embodiment

FIG. 7 is a circuit diagram of an SOS signal generating circuit of a third embodiment. The configurations of first and second bias superimposing circuits 21A and 21B in the third embodiment are the same as that of the second embodiment. That is to say, the first and second bias superimposing circuits 21A and 21B are configured with NPN transistors TR1 and TR2 with the same specification, respectively, and in the first bias superimposing circuit 21A, a light receiving voltage Vo outputted from an I-V converting circuit 11 is applied to the base of the first NPN transistor TR1 via a first base resistor Rb1, while the light receiving voltage Vo, in the second bias superimposing circuit 21B, is applied to the base of the second NPN transistor TR2 via a second base resistor Rb2 with the same resistance as the first base resistor Rb1. The emitters of the first and second NPN transistors TR1 and TR2 are connected with the first and second emitter resistors Re1 and Re2, respectively, and the transistors TR1 and TR2 output emitter voltages as first and second voltage signals V1 and V2, respectively, the voltage signals being inputted to a comparator 23. In this case, the resistance of the second emitter resistor Re2 is smaller than that of the first emitter resistor Re1. On the other hand, it is noted that the third embodiment is different from the second embodiment in a point that an LPF circuit 22 as a waveform shaping circuit is connected with the base of the second NPN transistor TR2. That is, the LPF circuit 22 is configured with a condenser C connected to the second base resistor Rb2.

In a similar fashion of the first embodiment or the second embodiment, an SOS signal, in the third embodiment, can be obtained such that there is substantially no time lag in the synchronizing timing despite output fluctuations of LD and PD or DC level shifts.

Fourth Embodiment

FIG. 8 is a circuit diagram of an SOS signal generating circuit of a fourth embodiment, which corresponds to a variation of the first embodiment. In first and second bias superimposing circuits 21A and 21B of this embodiment, a first diode D1 and a second diode D2 are connected with a first constant current circuit 31 and a second constant current circuit 32, instead of the first and second emitter resistors, respectively. The first and second constant current circuit 31 and 32 are controlled by external signals to adjust respective currents thereof. In this case, a signal is applied as the external signal, which is outputted from a current controlling circuit 34 that controls the constant current circuits 31 and 32 on the basis of a light receiving voltage detected by a light receiving voltage detecting circuit 33 that detects the light receiving voltage Vo outputted from a PD. It is noted that a signal that is not directly concerned with the light receiving voltage Vo can be applied as the external signal.

In this embodiment, when the level of the light receiving signal outputted from the PD 5 decreases, in order to meet such a change, a current of the second constant current circuit 32 is increased to increase a bias current, or a current of the first constant current circuit 31 is reduced. On the contrary, when the level of the light receiving signal increases, a current of the first constant current circuit 31 is increased, or a current of the second constant current circuit 31 is reduced. Such operations enable to generate a bias difference ΔVbe between a first voltage signal V1 and a second voltage signal V2 such that the waveform of the first voltage signal V1 can intersects with that of the second voltage signal V2 that is waveform-shaped by a waveform shaping circuit 22, and thereby an adequate SOS signal can be obtained similar to any preceding embodiments.

In the first and fourth embodiments, preferably, the first and second diode D1 and D2 may have the same characteristics. Further preferably, in the second and third embodiments, the first and second NPN transistor TR1 and TR2 may have the same characteristics. For these purposes, preferably, when constituting the SOS signal generating circuit, the first and second diodes or the NPN transistors may be configured with the same model of diodes or the same model of transistors that are fabricated in the same process, and they may be mounted close to one another on the same circuit board. The same lot of parts, or parts that are fabricated on the same semiconductor substrate and are incorporated in the same package are the most preferable to be used for the first and second diodes or the NPN transistors. In addition, it is noted that in the aforementioned embodiments, the transistor is not limited to an NPN transistor and may be a PNP transistor or a field-effect transistor. Furthermore, in the first, second, and third embodiments, at least one of the first and second emitter resistors may be configured with a variable resistor to fine adjust a bias current. Additionally, the first and second bias superimposing circuits may be configured with transistors or diodes with different specifications to carry different bias currents, respectively.

The present disclosure relates to the subject matter contained in Japanese Patent Application No. P2004-267750, filed on Sep. 15, 2004, which is expressly incorporated herein by reference in its entirely.

What is claimed is:

1. A light scanning device, comprising:
   a light emitting system configured to emit a light beam to be scanned;
   a light scanning system configured to deflect the light beam emitted from the light emitting system to scan the light beam on a photosensitive surface;
   a light receiving system configured to receive the light beam and output a light receiving signal; and
   a synchronizing signal generating system configured to generate a synchronizing signal with which light scanning performed by the light scanning system is synchronized,
   wherein the synchronizing signal generating system divides the light receiving signal into two light receiving signals and includes:
   a first bias superimposing system configured to superimpose a first bias signal onto one of the two light receiving signals to generate a first light receiving signal of the two light receiving signals;
   a second bias superimposing system configured to superimpose a second bias signal with a different level from the level of the first bias signal onto the other of the two light receiving signals to generate a second light receiving signal of the two light receiving signals;
   a waveform shaping system configured to shape the waveform of the second light receiving signal; and
   a comparing system configured to compare the first light receiving signal with the second light receiving signal to output the synchronizing signal.

2. The light scanning device according to claim 1, wherein the waveform shaping system reduces a signal peak which arises while the light receiving system is receiving the light beam.

3. The light scanning device according to claim 2, wherein the waveform shaping system is a low-pass filter.

4. The light scanning device according to claim 1,
   wherein the first and second bias superimposing systems are configured to generate the first and second bias signals with different levels by making bias currents to be carried through the first and second bias superimposing systems different from one another and superimpose the first and second bias signals onto respective ones of the two light receiving signals to generate the first and second light receiving signals, respectively.

5. The light scanning device according to claim 4,
   wherein each of the first and second bias superimposing systems is configured as a series circuit of the same kind of element and a resistor, and
   wherein the first and second bias signals are generated by applying the respective resistors with different resistances from one another to the first and second bias superimposing systems, respectively.

6. The light scanning device according to claim 4,
   wherein each of the first and second bias superimposing systems is configured as a series circuit of the same kind of element and a constant current source, and
   wherein each of the first and second bias signals is generated by independently controlling the current value of the constant current source.

7. The light scanning device according to claim 5,
wherein the element, in each of the first and second bias superimposing systems, is configured with one of a diode and a transistor, and is mounted close to the other element on the same circuit board.

8. The light scanning device according to claim 5,
wherein the element, in each of the first and second bias superimposing systems, is configured with one of a diode and a transistor, and is incorporated together with the other element in the same package.

9. The light scanning device according to claim 6,
wherein the element, in each of the first and second bias superimposing systems, is configured with one of a diode and a transistor, and is mounted close to the other element on the same circuit board.

10. The light scanning device according to claim 6,
wherein the element, in each of the first and second bias superimposing systems, is configured with one of a diode and a transistor, and is incorporated together with the other element in the same package.

11. A light scanning device, comprising:

a light emitting system configured to emit a light beam to be scanned;

a light scanning system configured to deflect the light beam emitted from the light emitting system to scan the light beam on a photosensitive surface;

a light receiving system configured to receive the light beam and output a light receiving signal; and a synchronizing signal generating system configured to generate a synchronizing signal with which light scanning performed by the light scanning system is synchronized, wherein the synchronizing signal generating system divides the light receiving signal into two light receiving signals and includes:

a first bias superimposing system configured to superimpose a first bias signal onto one of the two light receiving signals to generate a first light receiving signal of the two light receiving signals;

a second bias superimposing system configured to superimpose a second bias signal with a different level from the level of the first bias signal onto the other of the two light receiving signals to generate a second light receiving signal of the two light receiving signals;

a waveform shaping system configured to shape the waveform of the second light receiving signal to reduce a signal peak which arises while the light receiving system is receiving the light beam; and a comparing system configured to compare the first light receiving signal with the second light receiving signal to output the synchronizing signal, wherein the first and second bias superimposing systems are configured to generate the first and second bias signals with different levels by making bias currents to be carried through the first and second bias superimposing systems different from one another and superimpose the first and second bias signals onto respective ones of the two light receiving signals to generate the first and second light receiving signals, respectively.

* * * * *